United States Patent
Eibling et al.

(10) Patent No.: US 6,609,007 B1
(45) Date of Patent: Aug. 19, 2003

(54) APPARATUS AND METHOD FOR CONTROLLING THE TRANSMISSION POWER OF THE FORWARD LINK OF A WIRELESS COMMUNICATION SYSTEM

(75) Inventors: Edward Ellis Eibling, Convent Station, NJ (US); Raafat Edward Kamel, Westfield, NJ (US); Wen-Yi Kuo, Morganville, NJ (US); Mathew Thomas, Scotch Plains, NJ (US); Carl Francis Weaver, Township of Hanover, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/395,494

(22) Filed: Sep. 14, 1999

(51) Int. Cl.[7] ................................. H04Q 7/20
(52) U.S. Cl. ....................... 455/522; 455/561
(58) Field of Search .................. 455/69, 522, 67.1, 455/67.3, 561, 424, 425; 370/342

(56) References Cited

U.S. PATENT DOCUMENTS

| | | | |
|---|---|---|---|
| 5,530,920 A | 6/1996 | Takeda | 455/102 |
| 5,577,022 A | 11/1996 | Padovani et al. | 370/13 |
| 5,666,356 A | 9/1997 | Fleming | 370/328 |
| 5,708,681 A | 1/1998 | Malkemes et al. | 375/297 |
| 5,825,835 A | 10/1998 | Kingston et al. | 375/367 |
| 5,862,453 A * | 1/1999 | Love et al. | 455/522 |
| 5,903,554 A * | 5/1999 | Saints | 455/67.3 |
| 5,937,353 A | 8/1999 | Fapojuwo | 455/444 |
| 6,034,971 A * | 3/2000 | Love et al. | 370/468 |
| 6,044,072 A | 3/2000 | Ueda | 370/335 |
| 6,061,339 A | 5/2000 | Nieczyporowicz et al. | 370/335 |
| 6,112,092 A | 8/2000 | Benveniste | 455/450 |

FOREIGN PATENT DOCUMENTS

| | | | |
|---|---|---|---|
| EP | 0 750 440 A | 12/1996 | H04Q/7/38 |
| EP | 0805568 A1 | 11/1997 | H04B/7/185 |
| EP | 0 889 663 | 1/1999 | H04Q/7/38 |

OTHER PUBLICATIONS

European Patent Office Search Report, Application No. EP 00 30 5850, Berlin, Oct. 18, 2001.
Patent No. 5,715,526, filed on Sep. 8, 1995 and issued on Feb. 3, 1998 to Lindsay A. Weaver, Jr. and Robert W. Boesel. Class: H01Q 11/12.

* cited by examiner

Primary Examiner—Nguyen T. Vo

(57) ABSTRACT

A method that adjusts the power level of a set of forward-link signals of a base station responsive to the loading of the forward link as determined by a power level measurement of the signal set. One power level measurement is a pilot fraction of the forward link. Other power level measurements, such as the signal set's power level, can be used, alone or in combination, instead of or in addition to the pilot fraction of the forward link to adjust the power level of the signal set. The power level of the signal set can be changed in any manner, including by scaling it by a scaling factor, or by increasing the power level by a fixed or a variable amount. The power level measurement of the signal set is obtained during a current time period. The scaling factor that will be used in the subsequent time period is determined using the power level measurement. In one embodiment of the invention, the scaling factor can be obtained from a look-up table that is based on the power level measurement. If the cell containing the base station includes several sectors, the power level of the signal set in a sector is adjusted when the power level measurement in that sector indicates that the power level should be adjusted.

23 Claims, 2 Drawing Sheets

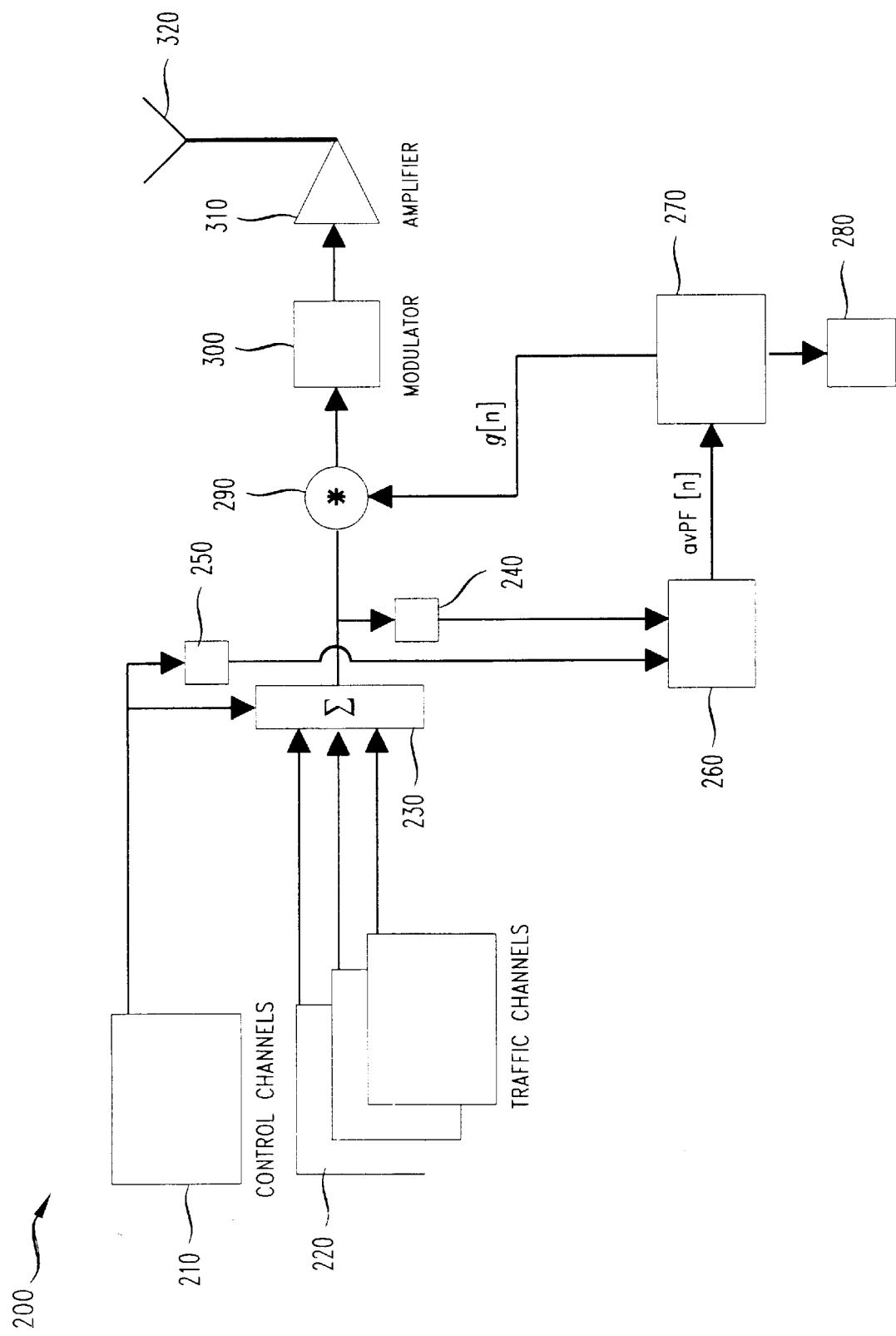

APPARATUS AND METHOD FOR CONTROLLING THE TRANSMISSION POWER OF THE FORWARD LINK OF A WIRELESS COMMUNICATION SYSTEM

CROSS REFERENCE TO RELATED APPLICATION

Related subject matter is disclosed in the following applications assigned to the same Assignee hereof: U.S. patent application "Aggregate Overload Power Control", Ser. No. 09/356,825 continued in Continuation in Part "Aggregate Overload Power Control", Ser. No. 09/385,305, and U.S. patent application "Method For Initiating Call Blocking Based Upon Pilot Fraction", Ser. No. 09/356,816.

BACKGROUND OF THE INVENTION

1. Field of the Invention

The present invention relates generally to wireless communication systems and, in particular, to power of the forward link in wireless communication systems.

2. Description of the Related Art

Wireless communication systems employ Code Division Multiple Access ("CDMA") modulation techniques to permit a large number of system users to communicate with one another. The ability of such a system to work is based on the fact that each signal is coded with spreading sequences, such as pseudo-random noise ("PN") sequences, and orthogonal spreading sequences such as Walsh codes. This coding permits signal separation and signal reconstruction at the receiver. In typical CDMA systems, communication is achieved by using a different spreading sequence for each channel. This results in a plurality of transmitted signals sharing the same bandwidth. Particular transmitted signals are retrieved from the communication channel by despreading a signal from all of the signals by using a known user despreading sequence related to the spreading sequence implemented at the transmitter.

FIG. 1 illustrates CDMA system 10. The geographic area serviced by CDMA system 10 is divided into a plurality of spatially distinct areas called "cells." Although cells 2, 4, 6 are illustrated as a hexagon in a honeycomb pattern, each cell is actually of an irregular shape that depends on the topography of the terrain surrounding the cell. Each cell 2, 4, 6 contains one base station 12, 14, and 16, respectively. Each base station 12, 14, and 16 includes equipment to communicate with Mobile Switching Center ("MSC") 18, which is connected to local and/or long-distance transmission network 20, such as a public switch telephone network (PSTN). Each base station 12, 14, and 16 also includes radios and antennas that the base station uses to communicate with mobile terminals 22, 24.

When a call is set up in a CDMA system, a base station and mobile terminal communicate over a forward link and a reverse link. The forward link includes communication channels for transmitting signals from the base station to the mobile terminal, and the reverse link includes communication channels for transmitting signals from the mobile terminal to the base station. The base station transmits certain types of control information to the mobile terminal over a communication channel, referred to herein as a forward control channel, also known in the art as a forward overhead channel. Forward control channels include the pilot, paging, and synchronization channels, as well as other control channels. The base station transmits voice or data, and certain types of control information over a communication channel, referred to herein as a forward traffic channel. The signals on the communication channels are organized in time periods, referred to herein as frames. Frames are typically 20-millisecond (ms) in length. The signals transmitted over the control channels are referred to herein as control signals, and the signals transmitted over the traffic channels are referred to herein as traffic signals.

When a call is added to a cell, the noise level in the cell and in the surrounding cells is increased. If there is a large number of calls in a particular cell 4, it becomes difficult for mobile terminal 24 to clearly obtain the pilot and/or the forward-link traffic signal, particularly if mobile terminal 24 is at the edge of a cell. When mobile terminal 24 cannot obtain a clear and continuous pilot and/or the forward-link traffic signal, problems can result on the call between mobile terminal 24 and base station 14. These problems can range from not being able to despread a frame, which results in an erred frame, to the mobile terminal 24's user hearing noise or silence instead of the voice or data that was transmitted, which results in an inconvenience to the user. If mobile terminal 24 cannot obtain a clear and continuous pilot and/or the forward-link traffic signal for a prolonged period or time, such as several seconds, the call may be dropped, which results in an inconvenience to the user and a loss of revenue.

When cell 4 is heavily loaded with calls, base station 14's equipment may not be able to handle all of the calls in cell. This can occur when the power transmitted by the base station exceeds the power level at which the base station's equipment is designed to operate over an extended time period. In some wireless communication systems 10, when there are many calls base station 14 initiates overload control. Base station 14 implements overload control by using one of several remedies. These remedies typically include: a) denying access to any new call requests, referred to herein as call blocking; b) restricting transmitted signals to their current levels; or c) even clipping transmitted signals. The inventors have discovered that this could occur even when other cells 2 and 6, may be able to accept new calls. This situation results in a loss of capacity of the overall wireless communication system 10.

SUMMARY OF THE INVENTION

The invention solves the above problems by adjusting the power level of a set of forward-link signals of a base station responsive to the loading of the forward link as determined by a power level measurement of the signal set. The power level of the signal set is adjusted independent of the individual power control of each of the forward-link signals in the set. Adjusting the power level of the signal set allows a cell that contains the base station to grow, i.e. cover a larger area, when the loading of the forward link is low. This allows a lightly loaded cell to accept calls from mobile terminals that may otherwise have been geographically constrained to a heavier loaded cell, thereby lightening the load in the heavier loaded cell. This also allows mobile terminals at the edge of cells to receive signals more clearly.

One power level measurement is a pilot fraction of the forward link, which is a ratio of the pilot's power level to the power level of the forward-link signals. Other power level measurements, such as the signal set's power level, can be used, alone or in combination, instead of or in addition to the pilot fraction of the forward link to adjust the power level of the signal set. Adjusting the power level of the signal set using several measurements involves determining how the power level of the signals set should be adjusted based on any of the power level measurements and adjusting the power level of the signal set when any one of the measurements indicates that the power level should be adjusted. Alternatively, the power level can be adjusted when several of the measurements indicate that the power level should be adjusted.

The power level of the set can be changed in any manner, including by scaling it by a scaling factor, or by increasing the power level by a fixed or a variable amount. The power level measurement of the signal set is obtained during a current time period. The scaling factor that will be used in the subsequent time period is determined using the power level measurement. In one embodiment of the invention, the scaling factor can be obtained from a look-up table that is based on the power level measurement.

If the cell containing the base station includes several sectors, the power level of the signal set in a sector is adjusted when the power level measurement in that sector indicates that the power level should be adjusted.

BRIEF DESCRIPTION OF THE DRAWINGS

FIG. 2 is a block diagram of a portion of a base station where the power level of a set of forward-link signals is adjusted responsive to the loading of the forward link as determined by a pilot fraction.

DETAILED DESCRIPTION

Figure 1:
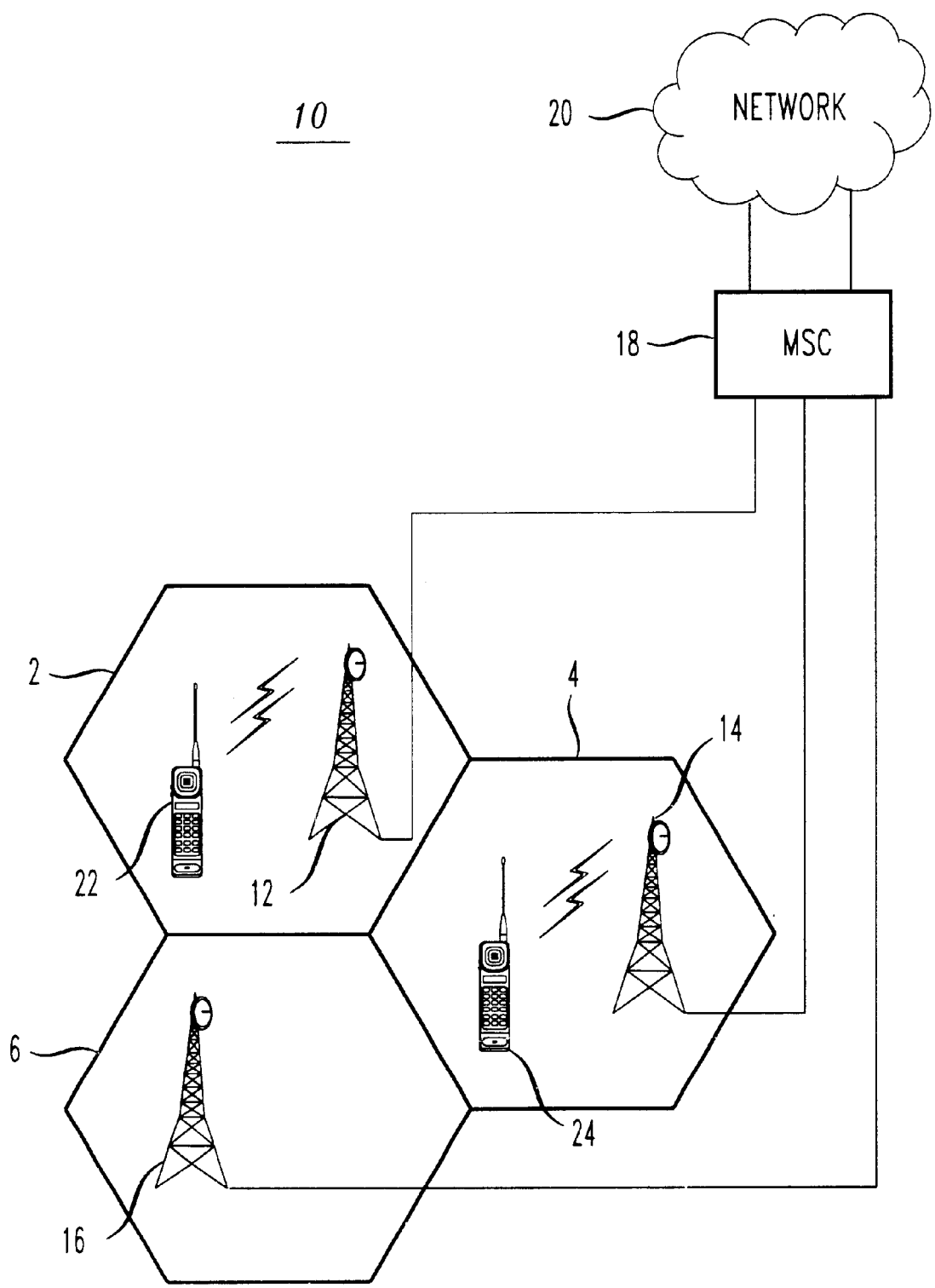
FIG. 1 is a block diagram of a portion of a conventional base station.

FIG. 2 shows a portion of base station 200 that adjusts the power level of a set of forward-link signals of a base station responsive to the loading of the forward link as determined by a power level measurement of the forward link. The power level measurement used in base station 200 is a pilot fraction of the forward link, which is a ratio of the pilot's power level to the power level of the set of forward-link signals of base station 200.

Although, in the illustrative embodiment base station 200 uses the pilot fraction to adjust the power level of the signal set, other power level measurements can be used, alone or in combination, instead of or in addition to the pilot fraction of the forward link to adjust the power level of the signal set. For example, the power level measurement can be the power level of the signal set.

Each of the base station's signals is the output of one of channel elements 210, 220. The channel elements encode the data with the spreading codes. The control signals are the outputs of control-channel channel elements 210, and the traffic signals are the output of traffic-channel channel elements 220. The output of all of the channel elements 210 and 220 is coupled to combiner 230 where all of the signals are combined together to form a combined-baseband signal. The signals are organized in frames, which, as described above, are typically 20-millisecond (ms) time periods. The instantaneous signal levels of the combined-baseband signal are measured throughout the current frame, and are then averaged in sample-square-integrate circuit 240. This averaged power level is referred to herein as the combined-baseband signal's power level for the current frame. The pilot's instantaneous signal levels are also measured throughout the current frame, and are then averaged in sample-square-integrate circuit 250. This averaged power level is referred to herein as the pilot's power level for the current frame. The combined-baseband signal's power level and the pilot's power level for the current frame are the input of first averaging element 260.

First averaging element 260 determines the current frame's ratio of the pilot's power level to the combined-baseband signal's power level, referred to herein as the current frame's pilot fraction PF[n]. First averaging element 260 determines the average pilot fraction avPF[n] using a single pole infinite impulse response (IIR) filter. The functionality of the IIR filter is described in equation 1. As shown in equation 1, the value of the average pilot fraction avPF[n] is based on the current frame's pilot fraction PF[n] scaled by $\lambda$, and the previous frame's average pilot fraction avPF[n] scaled by an adjustment factor based on $\lambda$. $\lambda$ controls how rapidly the average pilot fraction avPF[n] changes in response to variations in the pilot fraction of the current frame PF[n]. $\lambda$ is selected to balance a desire to obtain a pilot fraction that is as reflective as possible of the current frame's pilot fraction and a desire to have a smoothly varying power level. A typical value for $\lambda$ can be between about 2 and 200.

$$avPF[n] = \frac{1}{\lambda} * PF[n] + \left(1 - \frac{1}{\lambda}\right) * avPF[n-1] \qquad (1)$$

First averaging element 260 provides the current average pilot fraction avPF[n] to controller 270. Controller 270 obtains a look-up table from memory 280. The look-up table relates the average pilot fraction avPF[n] to scaling factor g[n+1]. Table 1 is an example of a look-up table that can be used. Controller 270 obtains scaling factor g[n+1] from the look-up table by determining the value in the look-up table to which the average pilot fraction avPF[n] is closest. When the pilot fraction is directly between two values listed in the table scaling factor g[n+1] can be chosen to be either the one associated with the greater or smaller value, although it is preferable to chose the smaller value to ensure that base station 200 can produce the required power level without straining its amplifier.

TABLE 1

| Average Pilot Fraction | Scaling Factor |
| --- | --- |
| .78 | 1.5 |
| .6 | 1.4 |
| .5 | 1.3 |
| .4 | 1.2 |
| .3 | 1.1 |
| .2 | 1 |
| .1 | .9 |

The scaling factors in the look-up table are chosen to adjust the power level of the signal set to maximize the capacity of the system without overloading base station 200's equipment. Preferably, a scaling factor of one is associated with the fall load pilot fraction, which is the pilot fraction when the base station is at full load. Typically, the full load pilot fraction is between 0.1 and 0.25. Also preferably, the largest scaling factor is associated with pilot-fraction at no load. At no load the base station is typically transmitting the pilot, page, and synch channels. The pilot fraction at no load is the ratio of the pilot's power level to the sum of power levels of the pilot, the paging channel, and the synch channel. The pilot fraction at no load is typically about 0.78.

When the signal set's power level is scaled by the scaling factor that increases the signal set's power level, then, typically, the forward-link coverage area of base station 200 also increase. This means after the power level of the signal set is scaled, the signals may be able to reach mobile terminals that the signal may not have been able to reach before. However, the forward-link traffic signals do not need to reach mobile terminals that the pilot does not reach. This is due to the fact that if a mobile terminal is not receiving the pilot it is not able to communicate with base station 200, and therefore there is no benefit in the mobile terminal receiving the signal. Therefore, the forward-link coverage area preferably does not exceed an area in which a mobile terminal at the edge of the area is able to receive the pilot.

After, controller 270 obtains scaling factor g[n+1], controller 270 provides the scaling factor as an input of multiplier 290. The other input of multiplier 290 is the combined-baseband signal, which is the output of combiner 230. Multiplier 290 multiplies the combined-baseband signal and scaling factor g[n+1] to scale the power level P[n+1] of the signal set during the subsequent frame. The power level of the signal set is scaled by scaling factor g[n+1], which is obtained using the average pilot fraction avPF[n] of the last frame. However, the delay between the frame whose pilot fraction is used to obtain the scaling factor, and the frame whose power level is scaled by the scaling factor can be made larger or smaller based on the speed of first averaging element 260 and controller 270. For example, if the circuitry of the first averaging element 260 and controller 270 is fast enough, or if the signals can be delayed until the scaling factor is obtained, the power level P[n] can be scaled by scaling factor g[n] obtained using the average pilot fraction avPF[n] of the current frame. The signal can be delayed by adding a pipeline delay between combiner 230 and multiplier 290.

Multiplier 290 multiplies the scaling factor and the combined-baseband signal that forms the subsequent frame, thereby scaling the power level P[n+1] of all of the signals by the same amount. The result is then input into modulator 300 where the signal is slightly amplified and is modulated onto a carrier signal. The modulated signal is amplified in amplifier 310 and then transmitted via the antenna 320 to the mobile terminals.

Although, in this embodiment the pilot fraction is the power level measurement used to obtain the scaling factor, in alternative embodiments other power level measurements, such as the power level of the signal set can be used, alone or in combination, instead of or in addition to the pilot fraction of the forward link to obtain the scaling factor. Therefore, similar look-up tables as the one described above can be obtained for other power level measurements. Determining the scaling factor using one of the other power level measurements is performed in a similar manner as for the pilot fraction.

Additionally, although, in this embodiment a look-up table is used to obtain the scaling factor, in alternative embodiments the scaling factor can be obtained in other ways.

The adjustments of the power level of the signal set described above are performed independent of the conventional individual power control of each of the traffic signals. Therefore, when the mobile terminal receives a traffic signal, in IS-95 compliant CDMA systems the mobile terminal checks to determine whether the received forward-link traffic frame is in error. In a subsequent reverse-link traffic frame that the mobile terminal transmits, the mobile terminal indicates to base station 200 whether there was an error. When the mobile terminal receives a traffic signal, in CDMA 2000 systems the mobile terminal checks to determine whether the received forward-link traffic signal has sufficient signal strength to overcome the noise in the system, typically by checking the forward-link, traffic signal's signal-to-noise ratio. The mobile terminal then indicates to base station 200 whether the forward-link traffic signal strength is sufficient. Upon receiving from the mobile terminal the information of whether there was an error (in IS-95 compliant CDMA systems) or whether the forward-link traffic signal strength is sufficient (in CDMA 2000 systems) base station 200 determines whether its forward link to this mobile terminal is in fading. Base station 200 then adjusts the power level of the signal to the mobile terminal accordingly, prior to the signal being summed in combiner 230. Preferably, the individual power control of each of the signals includes a maximum power level above which the signal's power level is not allowed to go. If a signal's power level is at this maximum power level, and the mobile terminal receiving this traffic signal indicates to the base station to increase the power level of this signal the base station will not further increase the power level of this traffic signal. The maximum power level ensures that no signal is using a significantly disproportionate amount of power.

After base station 200 adjusts the power level of the signal to the mobile terminal, the signal is then combined with the signals from other traffic channels, and then, if necessary, scaled.

The method for adjusting the power level of the signal set based on the power level measurement of the signal set can be used with methods of overload control. For example, the method for adjusting the power level of the signal set can be used with the overload power control method disclosed in U.S. patent application "Aggregate Overload Power Control", Ser. No. 09/356,825 continued in Continuation in Part "Aggregate Overload Power Control", Ser. No. 09/385,305, incorporated herein by this reference. This overload power control method changes the power level of a set of forward-link signals responsive to a overload control threshold power level that is based on the amplifier's maximum continuous power level, independent of the individual power control of each of the forward-link signals in the signal set. The power level of the signal set is changed by scaling it by a scaling factor. The total power level of the signal set is obtained during a current time period, and then the scaling factor that will be used in the subsequent time period is determined. The scaling factor is preferably based on the total power level of the signal set for the current time period, a scaling factor used during the current time period, and the overload control threshold power level. The amount by which the total power level exceeds the amplifier's maximum continuous power level is the overload amount. The scaling factor is selected so that for each time period the overload amount is reduced by a percentage or a fixed factor. For example, the overload amount can be reduced by 3% for the current time period, then the percentage may be changed for a subsequent time period based on the scaling factor of the current time period and the overload amount of the subsequent interval.

Additionally, the method for adjusting the power level of the signal set can be used with the method for initiating call blocking disclosed in U.S. patent application "Method For Initiating Call Blocking Based Upon Pilot Fraction", Ser. No. 09/356,816, incorporated herein by this reference. This method initiates call blocking responsive to a call-quality measurement of the forward link. The call-quality measurement is a measurement of how well a mobile terminal is able to receive the forward link. One call-quality measurement is the pilot fraction of the forward link. Call blocking can be initiated when the average pilot fraction is below a pilot-fraction blocking threshold. The pilot fraction is determined for the time period, and then used to determine an average pilot fraction for the time period. The average pilot fraction for the current time period is based on a pilot fraction for the current time period, and an average pilot fraction for a previous time period. When the average pilot fraction is below the pilot-fraction blocking threshold, call blocking is initiated. The pilot-fraction blocking threshold is preferably based on: 1) the pilot fraction when the base station is at full load; 2) the size, shape, and terrain of the cell; and 3) the aggressiveness of the overload control. In the preferred embodiment, the set includes all of the signals generated by the base station, alternatively, the set can include fewer than all the signals generated by the base station. For example, the set can include a plurality of traffic signals, or a plurality of traffic signals and one or more of the control signal. If the cell includes several sectors, the call blocking is initiated on a sector basis when the average pilot fraction of the sector is below the pilot-fraction blocking threshold.

The foregoing is merely illustrative. Thus, for example although in the illustrative embodiment the time period is one frame, any time period can be used during which a power level measurement of the forward link can be taken. For example, the time period can be several frames, or one or several power control groups, which are time periods having a length of 1/16 of a frame.

Furthermore, although in the illustrative embodiment all the signals in a sector of a cell containing the base station are scaled by the scaling factor, in an alternative embodiment fewer than all the signals in a sector can be scaled by the scaling factor. For example, the signal set can include a plurality of the traffic signals, or a plurality of the traffic signals and one or more control signals.

Still further, although in the illustrative embodiment the method is implemented in hardware, it can be implemented in software.

Additionally, although in the illustrative embodiment each cell is an omni sector cell, the cell can be divided into a plurality of sectors, with each sector having its own channel elements, radios, which include a modulator and an amplifier, and antennas. In this case, the power level measurement is taken on a per-sector basis and used to obtain a scaling factor. The power level of the signal set in a sector is adjusted when the power level measurement in that sector of the cell indicates that the power level should be adjusted.

Moreover, in one of the illustrative embodiments the average pilot fraction for the current time period is determined using an IIR filter. In an alternative embodiment a finite impulse response (FIR) filter can be used to determine the average pilot fraction. The FIR filter would use the pilot fraction for the current time period, and the pilot fractions of a plurality of frames, averaged over a plurality of frames.

Additionally, although in the illustrative embodiment the channel elements are shown in parallel, with the resulting signals combined in one combiner, the channel elements can be set up in series. In this case, the signal from each channel element is combined with signals from the previous channel elements in the series.

Furthermore, although in the illustrative embodiment the combined-baseband signal is scaled, in alternative embodiments the individual signals can be scaled. For example, the scaling factor is still obtained using the combined-baseband signal. However, instead of multiplying the combined-baseband signal by the scaling factor in multiplier 290 and 350, the scaling factor can be provided to control elements 210 and 220 where the individual signals can be scaled by the scaling factor.

Additionally, although in the illustrative embodiment the wireless communication system is a CDMA system, this should not be construed to limit the present invention to base stations and mobile stations employing CDMA techniques. The present invention may equally be applicable to base stations and mobile stations employing other multiple access techniques, such as Time Division Multiple Access ("TDMA"), and Global System for Mobile (GSM).

While the invention has been described with reference to a preferred embodiment, it will be understood by those skilled in the art having reference to the specification and drawings that various modifications and alternatives are possible therein without departing from the spirit and scope of the invention.

We claim:

1. A method for controlling a power level of signals transmitted over a forward link by a base station in a wireless system, the base station having a signal set of a plurality of forward link signals, each forward link signal of the plurality having an individual power control, the method comprising the step of:

adjusting the power levels of each of the forward link signals of the plurality as a function of the extent to which the forward link is loaded, the adjusting of the power level of each of the forward link signals being independent of the individual power control of the forward link signal being adjusted.

2. The method of claim 1, wherein the extent to which the forward link is loaded is determined as a function of a pilot fraction of the forward link.

3. The method of claim 1, wherein the extent to which the forward link is loaded is determined as a function of the signal set's power level.

4. The method of claim 1, wherein the signal set comprises all signals in a sector of a cell containing the base station.

5. The method of claim 1, further comprising the steps of:

obtaining a power level of the signal set for a time period;

obtaining a power level of a pilot for the time period; and determining a pilot fraction for the time period as a function of the obtained power levels; and wherein the adjusting step comprises:

scaling the power levels of each of the forward link signals of the plurality using a scaling factor which is a function of the pilot fraction, the scaling of the power level of each of the forward link signals being independent of the individual power control of the forward-link signal being scaled.

6. The method of claim 5, further comprising the step of determining the scaling factor by looking up the scaling factor in a look-up table that relates the pilot fraction to the scaling factor.

7. The method of claim 5, wherein the time period comprises a frame.

8. The method of claim 5, wherein the time period comprises a plurality of frames.

9. The method of claim 5, wherein the scaling step comprises scaling the power level of each of the forward link signals of the plurality during a subsequent time period using the scaling factor.

10. The method of claim 5, wherein the scaling step comprises scaling the power level of each of the forward link signals of the plurality during the time period using the scaling factor.

11. The method of claim 5, wherein:

a cell containing the base station comprises a first sector and a second sector;

the base station further having a second signal set of a second plurality of forward link signals, the signal set corresponding to the first sector and the second signal set corresponding to the second sector;

the step of obtaining the power level of the signal set comprises obtaining a power level for the signal set for the time period and obtaining a power level for the second signal set for the time period;

the step of determining the pilot fraction comprises determining a pilot fraction for the signal set for the time period and determining a pilot fraction for the second signal set for the time period; and the scaling step comprises scaling the power level of each of the forward link signals of the plurality of the signal set using a scaling factor which is a function of the pilot fraction determined for the signal set and scaling the power level of each of the forward link signals of the second plurality of the second signal set using a scaling factor which is a function of the pilot fraction determined for the second signal set.

12. The method of claim 5, wherein the scaling factor increases as the pilot fraction increases.

13. The method of claim 1,
further comprising the steps of:
obtaining a power level of the signal set for a time period;
obtaining a power level of a pilot for the time period; and
determining an average pilot fraction for the time period as a function of the obtained power levels; and
wherein the adjusting step comprises:
scaling the power levels of each of the forward link signals of the plurality using the scaling factor which is a function of the average pilot fraction, the scaling of the power level of each of the forward link signals being independent of the individual power control of the forward-link signal being scaled.

14. The method of claim 13, wherein the average pilot fraction for the time period is based on a ratio of the pilot's power level to the signal set's power level for the time period, and an average pilot fraction for a previous time period.

15. The method of claim 13, further comprising the step of determining the scaling factor by looking up the scaling factor in a look-up table that relates the pilot fraction to the scaling factor.

16. The method of claim 13, wherein the time period comprises a frame.

17. The method of claim 13, wherein the time period comprises a plurality of frames.

18. The method of claim 13, wherein the scaling step comprises scaling the power level of each of the forward link signals of the plurality during a subsequent time period using the scaling factor.

19. The method of claim 13, wherein the scaling step comprises scaling the power level of each of the forward link signals of the plurality during the time period using the scaling factor.

20. The method of claim 13, wherein a cell containing the base station comprises a plurality of sectors, each corresponding to at least one signal set and wherein:

the step of obtaining the power level of the signal set comprises obtaining a power level for each signal set for the time period;

the step of determining the average pilot fraction comprises determining an average pilot fraction for each signal set for the time period; and the scaling step comprises scaling the power level of each signal set using a scaling factor which is a function of the average pilot fraction for that set.

21. The method of claim 13, wherein the scaling factor increases as the average pilot fraction increases.

22. The method of claim 1, wherein the adjusting step comprises scaling the power levels of each of the plurality of the forward link signals of the signal set using a scaling factor that increases as the load of the base station decreases.

23. The method of claim 1,
further comprising the step of combining each of the of the forward link signals of the plurality to form a combined-baseband signal; and
wherein the adjusting step comprises adjusting the power levels of each of the forward link signals of the plurality by adjusting the combined-baseband signal.

* * * * *